R. J. SCHWAB.
MOLDING MACHINE.
APPLICATION FILED JUNE 20, 1907.
1,071,098.
Patented Aug. 26, 1913.
5 SHEETS—SHEET 1.
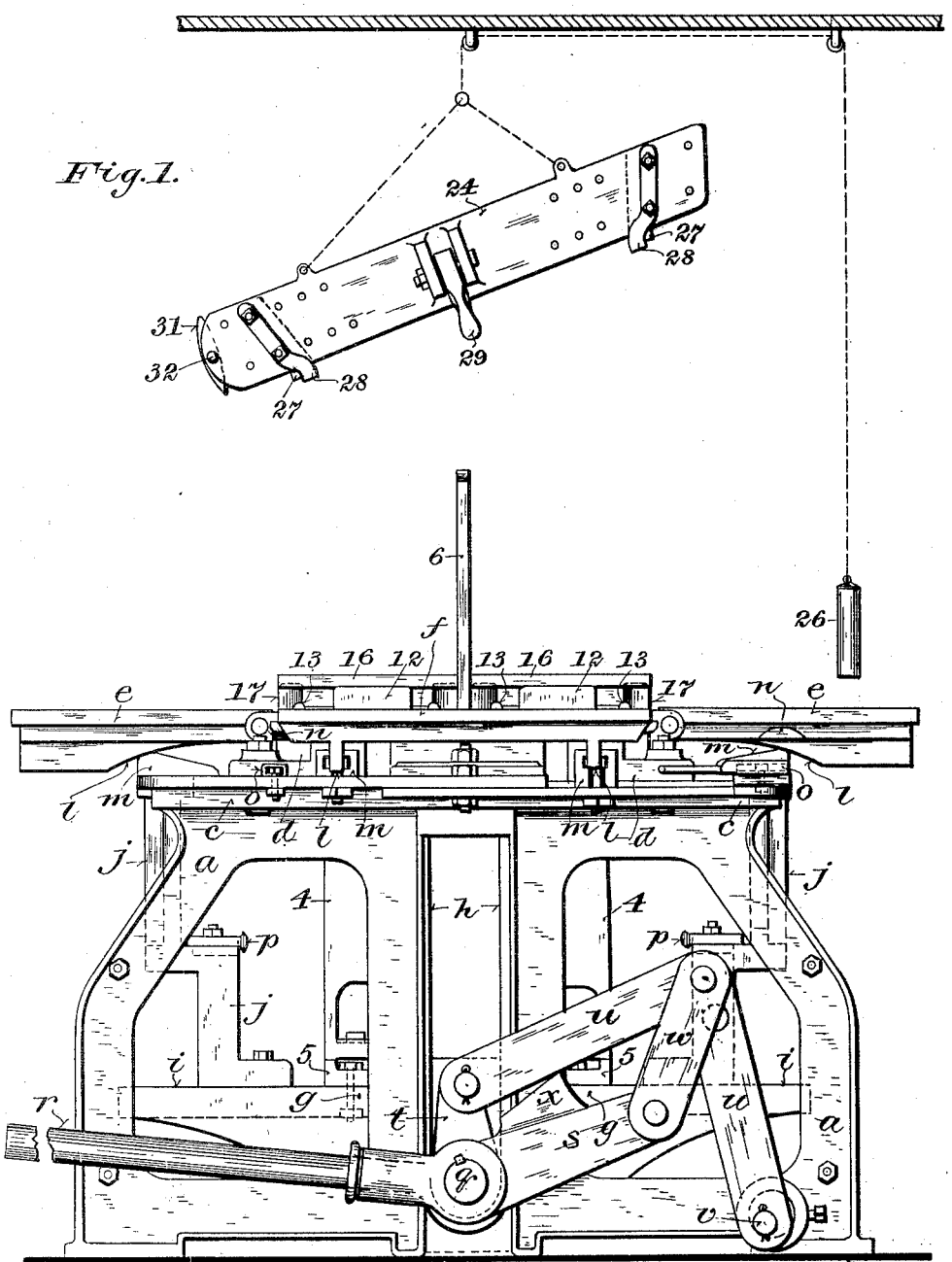

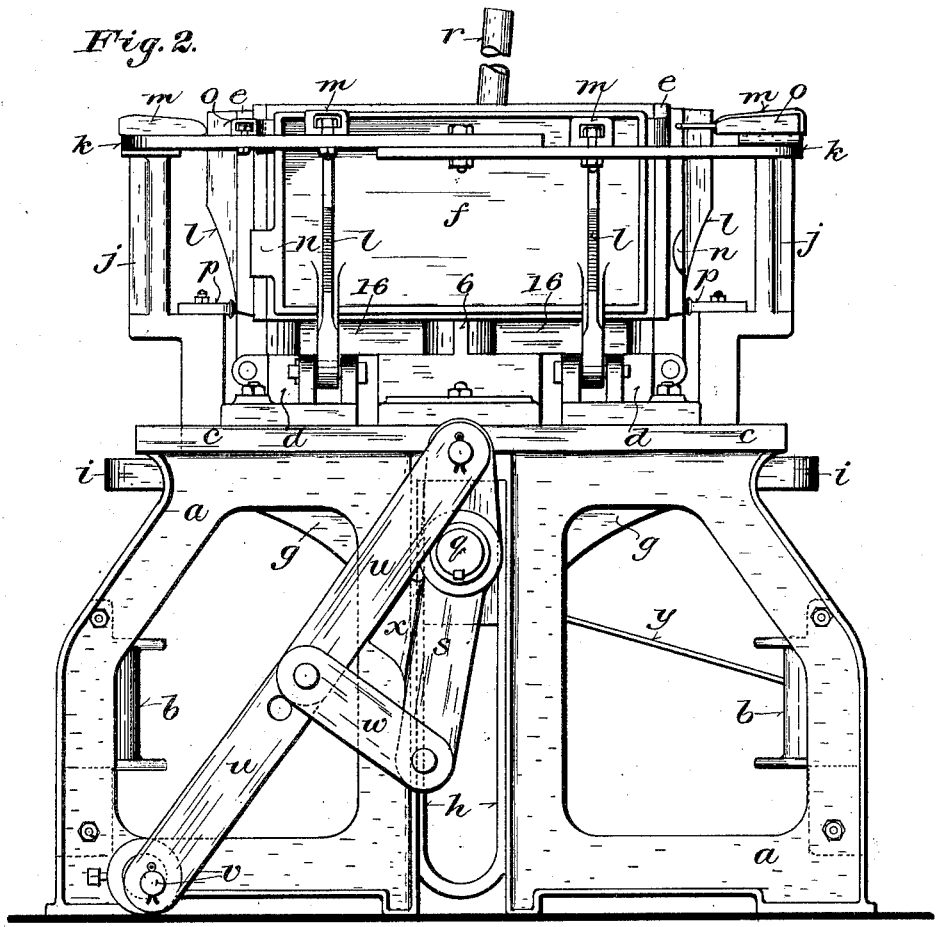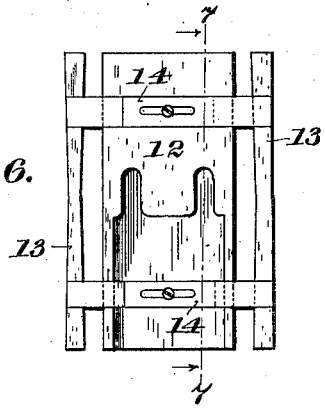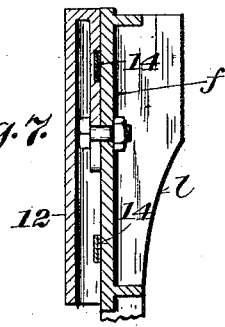

R. J. SCHWAB.
MOLDING MACHINE.
APPLICATION FILED JUNE 20, 1907.
1,071,098.
Patented Aug. 26, 1913.
5 SHEETS—SHEET 3.
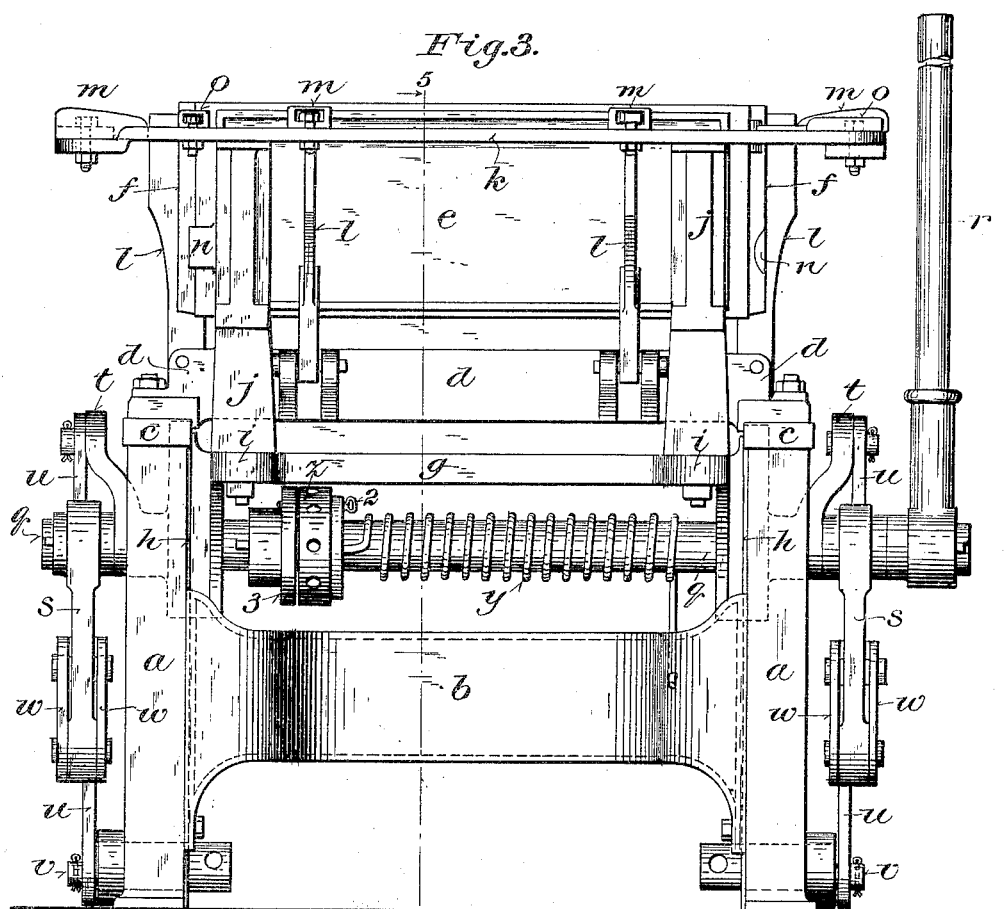
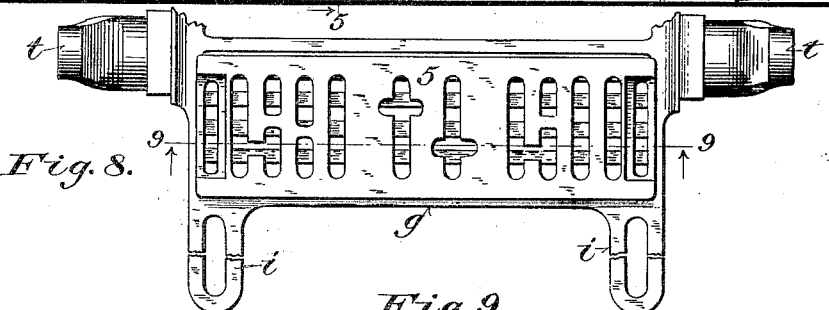
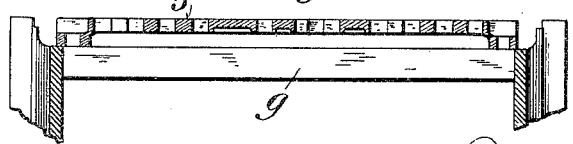
Witnesses:
Chas. L. Goss.
Mary C. Sears.
Inventor:
Rudolph J. Schwab,
By Winkler Vorder Bruegge & Hewett
Attorneys.

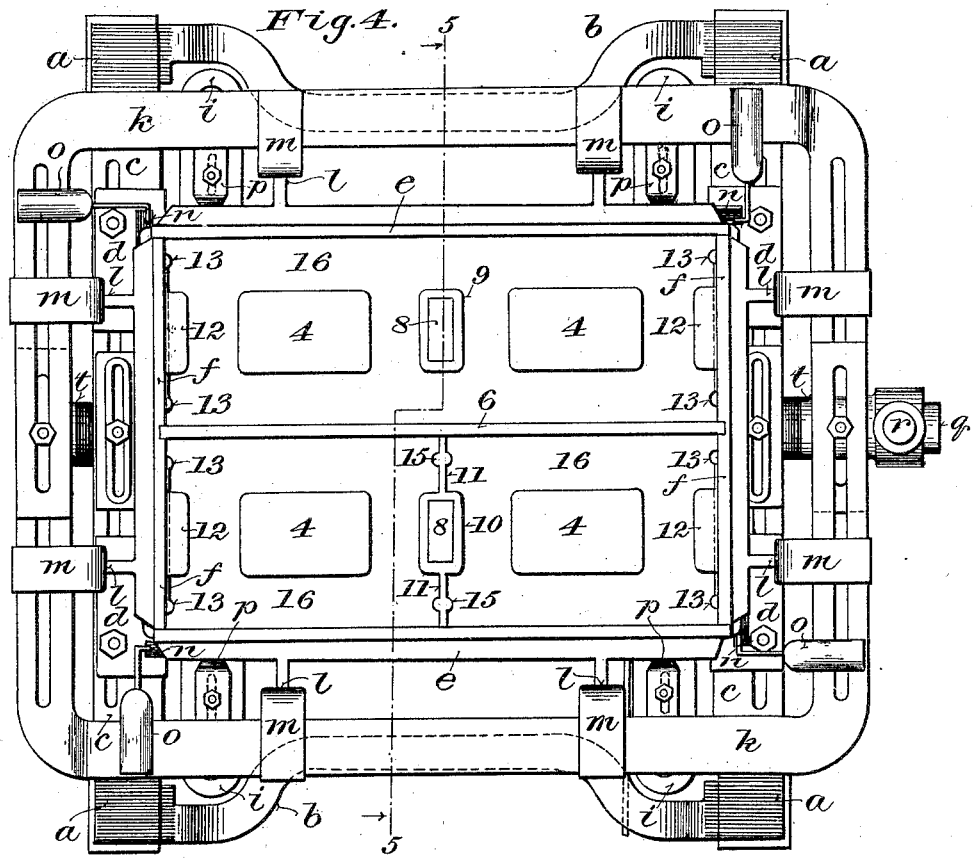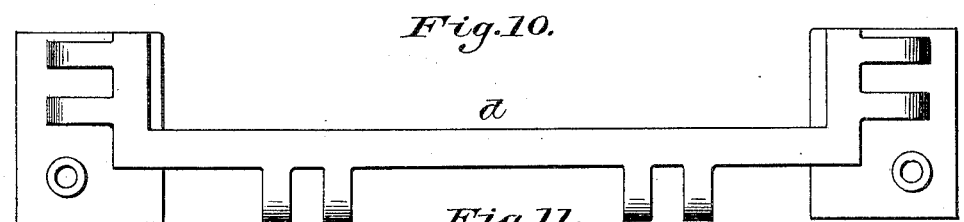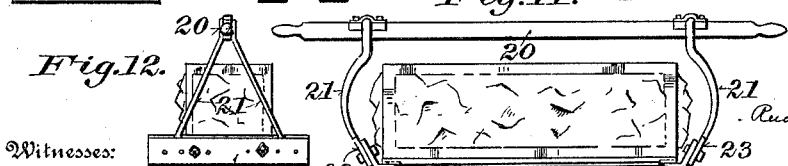

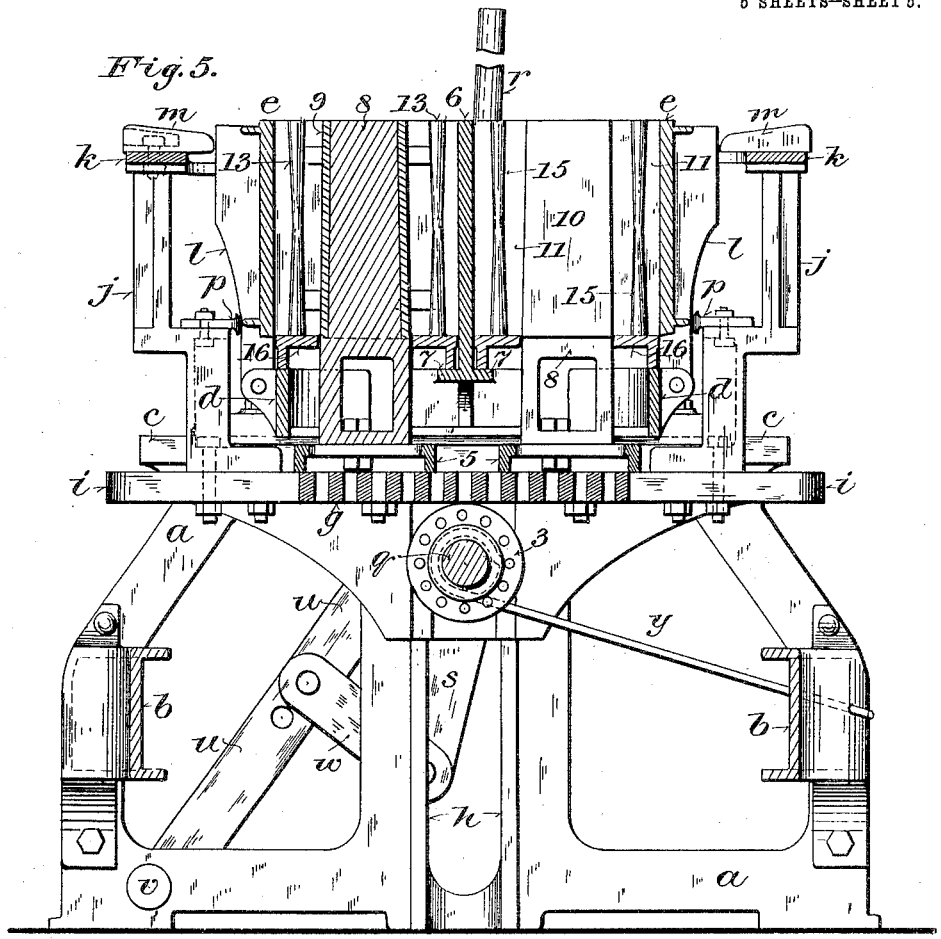

UNITED STATES PATENT OFFICE.

RUDOLPH J. SCHWAB, OF MILWAUKEE, WISCONSIN.

MOLDING-MACHINE.

1,071,098.  Specification of Letters Patent.  Patented Aug. 26, 1913.

Application filed June 20, 1907. Serial No. 379,860.

*To all whom it may concern:*

Be it known that I, RUDOLPH J. SCHWAB, a citizen of the United States, residing at Milwaukee, in the county of Milwaukee and State of Wisconsin, have invented certain new and useful Improvements in Molding-Machines, of which the following is a specification, reference being had to the accompanying drawing, forming a part thereof.

This invention relates more particularly to machines for making cement or concrete building blocks. Its main objects are to facilitate the production of blocks of this class; to provide for molding one or more blocks of various shapes and sizes at one operation; to extend the range of work which may be done on a machine of this kind; and generally to improve the construction and operation of machines of this class.

It consists in certain novel features of construction and in the peculiar arrangement and combinations of parts as hereinafter particularly described and pointed out in the claims.

In the accompanying drawing like characters designate the same parts in the several figures.

Figure 1 is an end elevation of a machine embodying the invention, showing the mold open; Fig. 2 is an elevation of the opposite end of the machine showing the mold closed; Fig. 3 is a side elevation of the machine as viewed from the left with reference to Fig. 1 and from the right with reference to Fig. 2; Fig. 4 is a plan view; Fig. 5 is a vertical cross section on the line 5 5, Figs. 3 and 4; Fig. 6 is a back view of a core block and associated mortar cavity cores to be removably attached to end plates of the mold; Fig. 7 is a vertical section on the line 7 7, Fig. 6; Fig. 8 is a fragmentary plan view of the core platform or support and of a core assembling plate removably mounted thereon; Fig. 9 is a vertical longitudinal section on the line 9 9, Fig. 8; Fig. 10 is a plan view on an enlarged scale of one of the bed rails to which the mold plates are hinged; Fig. 11 is a side elevation and Fig. 12 an end elevation on a reduced scale of a frame for removing the molded blocks from the machine; Fig. 13 is a fragmentary plan view and Fig. 14 a cross section on the line 14 14, Fig. 13, of an adjustable block supporting frame constituting a part of the machine; and Fig. 15 is a vertical cross section and Fig. 16 a partial longitudinal section of the removable hopper and the upper part of the closed mold on which it rests.

The main frame of the machine consists of two end sections $a$, which are rigidly connected by side pieces $b$. The end sections are formed or provided at the top with longitudinally slotted cross rails $c$ and have bases extending beyond the ends of the cross rails to firmly and steadily support the machine when the mold is extended for making large blocks or a number of blocks. The side pieces $b$ are inwardly curved or offset between their ends to permit the operator to approach and stand close to the mold when it is adjusted for making small or single blocks and thereby avoiding the necessity and discomfort of stooping in the operation of the machine. Longitudinal bed rails $d$ are adjustably mounted on the cross rails $c$, being movable toward and from each other and secured in adjusted position by bolts passing through the slots in the rails $c$.

The mold comprises drop side plates $e$ and end plates $f$, which are removably hinged near their lower edges to the bed rails $d$.

A vertically movable platform or core support $g$ is guided in the end sections $a$ of the frame on ways $h$. This platform is formed as shown in Figs. 5 and 8 with parallel longitudinal slots and at the corners with laterally projecting longitudinally slotted arms $i$. Upon these arms are adjustably mounted standards $j$, which are outwardly offset between their ends. To the upper ends of the standards $j$ is attached a frame $k$ composed of two similar U-shaped sections having lapping slotted ends which are adjustably bolted together, to admit of contracting or extending the width of the frame to correspond with the adjustments of the mold.

The mold plates are formed or provided on their outer sides with vertical inclines $l$, and opposite these inclines, bearing blocks $m$ are adjustably mounted on the frame $k$. The blocks $m$ are formed in their under sides with longitudinal T-shaped or undercut grooves to receive the heads of bolts by which they are secured to said frame so as to admit of readily adjusting them to properly engage with said inclines and to close the mold plates when the frame $k$ is lifted to its upper position. The construcion of these bearing blocks is such that cement or dirt cannot readily get into the grooves in their under sides and thus interfere with their adjustment.

To positively and automatically open the mold, the mold plates are formed at the ends with inclined lugs or cams $n$, and blocks $o$ formed or provided with hooks are adjustably attached to the frame $k$ in such positions that the hooks will engage with said inclines and swing the mold plates outwardly when the frame is lowered. The blocks $o$ like the blocks $m$ are formed with T-shaped or undercut grooves in their under sides, and are bolted in like manner to the frame $k$.

To take up wear or play in the hinges and to hold the side mold plates tightly closed at their lower edges, bearing pieces $p$ are adjustably mounted on the horizontal offsets of the standards $j$ in position to engage with the outer sides of said plates when the platform $g$ and frame $k$ are elevated, as shown in Figs. 2 and 5.

For raising and lowering the platform $g$ and opening and closing the mold, a rocker shaft $q$ is journaled in the ends of the platform below and parallel therewith. On one end of this shaft is fastened an operating arm or lever $r$, and outside of and adjacent to the end sections $a$ of the frame it is provided with arms $s$. The platform $g$ is formed or provided with arms or brackets $t$ which extend upwardly and outwardly from the vertical openings in the end sections $a$ and are connected with the lower parts of said sections near the base of the machine and adjacent to one side thereof, by toggle joints, each composed of two links or members $u$. The lower links or members $u$ are adjustably connected with the frame so as to vary the level of the platform in its upper position by eccentric pins $v$, and one of the members of each joint is formed with two or more holes, as shown in Figs. 1, 2 and 5, for adjustably connecting it with the other link or member and varying the total length of the toggle joints when extended, for a purpose hereinafter explained. The round shanks of these pins which are journaled in the frame, are formed with transverse holes, as shown in Fig. 3, for adjusting them, and they are fastened in place when adjusted by set screws, as shown in Figs. 1 and 2. The arms $s$ are connected by links $w$ with the toggle joints, and are formed or provided with projections or stops $x$ which by engagement with the upper links or members $u$, when they have passed slightly out of line with the lower links or members in lifting the platform to its upper position, securely hold the platform in that position when the operating lever $r$ is released.

The toggle joints with their operating connections above mentioned, afford a powerful leverage when they are extended as shown in Fig. 2, for starting the platform downward, the downward movement of the platform being slow at first and then rapid, as the toggle joints approach the position shown in Fig. 1. This enables the operator by a single manipulation of the lever $r$ to easily start the cores downward out of the molded blocks which surround them, an operation requiring considerable power, and then to rapidly move them to their lower position clear of the mold.

To counterbalance the platform $g$ and the parts mounted thereon, a spring $y$ is coiled around the shaft $q$ and attached at one end to the frame and at the other end to a collar $z$, which is loosely mounted on said shaft and formed in its periphery with a series of holes for turning it to adjust the tension of the spring. This collar is fastened in adjusted position by a pin 2 passing through it into one of a circular series of holes in a collar 3 which is fixed on the shaft $q$, as shown in Figs. 3 and 5.

Tapering cores 4 which may be made adjustable or of the various dimensions required, are grouped in various ways according to the sizes and shapes of the blocks to be molded, and mounted on the platform $g$.

To facilitate the adjustment of the machine and its equipment with cores for the various kinds and sizes of blocks to be molded, the cores for each kind and size of block are preferably grouped and mounted as shown in Fig. 5, upon a transversely slotted assembling plate 5, which is in turn adjustably and detachably bolted to the platform $g$. The end slots through which said assembling plate is bolted to the platform are countersunk or recessed, as shown in Figs. 8 and 9, so that the heads of the bolts will not project above the top of the plate, and the plate is recessed in the under side so that the heads or nuts of the bolts by which the cores are fastened thereto will not project below its marginal bearings and thus interfere with its attachment to the platform $g$.

To admit of molding two or more blocks at a time, the machine is provided with a partition 6, which is mounted parallel with the bed rails $d$ upon and adjustably secured at the ends to the cross rails $c$, thus dividing the mold lengthwise into two compartments. To hold the partition firmly in place when the mold is closed, the end plates $f$ are formed with notches which engage with corresponding lugs or projections on the ends of the partition at or near its upper edge, as shown in Fig. 4. Along its lower edge this partition is formed as shown in Fig. 5, on each side, with a ledge or flange 7, the upper face of which is in the same plane with the top faces of the rails $d$ so as to form a support for the removable frames upon which the blocks are molded, as hereinafter explained. Each of the compartments may be divided transversely into smaller compartments for molding fractional or small blocks, by a division plate, and to facilitate changing the mold for making either full size or fractional blocks with open recesses in the ends of the fractional blocks and corresponding vertical openings through the middle of the full size blocks, posts 8 are mounted in proper positions on the platforms $g$ or assembling plates 5, as shown in Figs. 4 and 5, and upon these posts are interchangeably fitted shells 9, which serve as cores to form openings in the larger blocks, and similar shells 10 with wings 11 on opposite sides, which subdivide the mold compartments crosswise, for making fractional blocks. The shell 10 with the wings forms open vertical recesses in the adjacent ends of the fractional or small blocks. To form similar open recesses in the other ends of the fractional blocks and in the ends of full size blocks, extensions or core blocks 12 are detachably secured to the end plates $f$ of the mold. These extensions or core blocks, as shown in Figs. 6 and 7, are hollow or recessed, and formed at the back with vetical slots or notches to facilitate engagement with and disengagement from the heads of bolts by which they are secured to the mold plates.

To form vertical mortar cavities in the ends of the building blocks, the end plates $f$ are provided with cores 13, which are adjustably connected with each other and with the intermediate core blocks 12 by thin lapping metal strips 14, which fit into transverse grooves or recesses in the backs of said blocks and are fastened therewith to the mold plates. By this construction the cores 13 are readily adjusted for molding blocks of different widths and are readily attached to and removed from the mold plates with the blocks 12. To form like mortar cavities in the inner ends of fractional blocks, the wings 11 are provided on opposite sides as shown in Figs. 4 and 5, with vertical projections 15, corresponding in shape with the cores 13.

To form the bottom of the mold or mold compartments and to support the blocks while they are being molded, removed and dried, the machine is provided with frames 16, loosely fitting into the mold or mold compartments around the cores and adapted to rest upon the tops of the bed rails $d$ and the ledges 7 of the partition plate 6. Each frame is composed as shown in Figs. 13 and 14, of two like or similar U-shaped sections lapped at the ends, one of which is slotted and adjustably bolted to the lapping end of the other section. The sections are strengthened by depending marginal flanges 17, which are curved or inwardly offset at the corners, thereby forming recesses and overhanging ledges to receive hooks for lifting and carrying off the frames with the molded blocks thereon, as shown in Figs. 11 and 12. The overhanging ledges at the corners of the frames are located sufficiently above the lower edges of the flanges 17 on which the frames rest, to permit the hooks of the carrying-off frame to be readily engaged therewith when the frames are in the machine, and to be disengaged and removed therefrom when the frames are deposited on a floor or plane surface, thus facilitating handling the blocks and avoiding the necessity of providing special drying racks or supports to carry the block supporting frames in such positions with relation to the floor or surface on which they are deposited that the hooks will be free and can be readily disengaged and removed. The overlapping end of each section of a frame is formed with an extension 18 which covers the joint between it and the underlapping end of the other section and forms recesses in the bottoms of blocks molded thereon between the ends of the blocks and the adjacent vertical openings therein, such recesses forming air passages between the vertical openings in adjoining blocks when laid in a wall. The frames 16 are provided as shown in Fig. 13, with adjustable and removable bridge pieces 19, for filling or partially filling the spaces between the cores.

For lifting and removing the molded blocks from the machine and depositing them upon the drying floor, a carrying frame is provided consisting as shown in Figs. 11 and 12, of a handle bar 20, hangers 21 pivotally suspended therefrom, and hooks 22 adjustably attached to cross bars 23 of the hangers. The hangers may be adjusted lengthwise of the bar 20 for frames 16 and blocks of different lengths, and the hooks 22 are adjustable lengthwise of the bars 23 for frames and blocks of different widths or thicknesses. The hanger arms which connect the cross bars 23 with the handle bar 20 may be conveniently made of metal rods looped over the bar 20 and diverging downwardly therefrom as shown in Fig. 12. They are curved outwardly toward the ends of the handle bar 20 as shown in Fig. 11, so as to avoid contact with the projecting faces of freshly molded blocks.

To facilitate filling the mold with the concrete or plastic material of which the blocks are made, the machine is provided with a removable hopper as shown in Figs. 1, 15 and 16. This hopper consists of end plates 24 and side plates 25, adjustably fastened at the ends to the end plates for varying its width according to the width or adjustment of the mold. It is suspended as shown in Fig. 1, by a cord or chain passing over pulleys attached to the ceiling or a support above the machine, and is counterbalanced by a weight 26 fastened to the other end of the cord or chain. The side plates of the hopper are provided at their lower edges with lugs 27 and the end plates are provided with adjustable lugs 28 to engage with the mold plates and hold the hopper in place thereon, as shown in Fig. 15. At the ends the hopper may be provided as shown in Figs. 1 and 16, with beveled counterweighted hooks 29 to engage with flanges on the end plates $f$ of the mold for holding the hopper against the action of the counterweight 26, in place on the mold.

To protect the upper edge of the partition 6, the hopper is provided with a longitudinal guard 30, which when it is placed in position on the mold, overhangs or covers the top of said partition as shown in Fig. 15. The guard is preferably made with its sides converging upwardly to a sharp edge to prevent the concrete from lodging thereon.

Between the extended front ends of the side plates 24 of the hopper and parallel with the side plates 25, is pivoted a strike 31, which has handles 32 at the ends and convex faces for removing surplus material from the top of the mold when it is filled, and for smoothing the material remaining in the mold flush with the upper edges of the mold plates.

The machine operates as follows: Adjusted and arranged as it is shown in the drawing, particularly in Figs. 4 and 5, for molding an ordinary full size block and two half blocks at the same time, the hopper is drawn down and placed on top of the closed mold, as shown in Fig. 15, and the compartments in the mold are then filled with concrete, which is thoroughly tamped. When the mold is completely filled, the hopper is released and lifted therefrom and the surplus material removed from the top of the mold by swinging the front side of the hopper downward and moving the strike 32 across the mold with one edge in contact with the upper edges of the mold plates. The exposed surface of the concrete is then smoothed by passing a convex or rounded side of the strike over it. The hopper being released and moved upward out of the way, is held in an elevated position by the counterweight 26 until it is needed again. The lever $r$ is now turned forward and downward from the position in which it is shown in Figs. 2, 3, 4 and 5, to the position in which it is shown in Fig. 1. By this operation the platform $g$ is lowered and the cores 4 and posts 8 with the shells 9 and 10 are withdrawn from the molded blocks, which remain stationary upon the frames 16. The frame $k$ descends with the platform $g$ upon which it is mounted, and the hooks on the blocks $o$ engaging with the inclines $n$, force the mold plates $e$ and $f$ outwardly, permitting them to drop into the positions in which they are shown in Fig. 1. The hooks 22 of the carrying frame are then caught under the corner ledges of each of the frames 16 and they are lifted and removed with the blocks thereon one at a time from the machine and deposited upon the drying floor. The lever $r$ is now turned back to its original upright position, lifting the platform $g$ with the cores and other parts mounted thereon into place for molding other blocks. The frame $k$ lifted with the platform $g$ and carrying the blocks $m$ in engagement with the inclines $l$ on the mold plates, closes the mold and securely locks and holds the mold plates $e$ and $f$ together, so as to resist the outward pressure of the concrete as it is compactly tamped in the mold. The hopper is now drawn down into place and secured to the top of the mold which is filled again, the operations being repeated as above explained.

To make building blocks in which the vertical openings do not extend clear through them, the platform is stopped and held with the tops of the cores below the top of the mold. This is readily accomplished by shifting the pivot pins connecting the members $u$ of the toggle joints so as to shorten them, as hereinbefore mentioned.

The machine may be easily and quickly adjusted, and the cores, core blocks and other accessories of the mold rearranged for molding blocks of a great variety of sizes and shapes, the operations of the machine in molding blocks of different kinds being substantially the same and as above explained.

I claim:

1. In a molding machine the combination of a frame, a vertically movable platform guided in said frame, toggle joints connecting said platform with the frame, and a rocker shaft journaled in and movable with said platform and provided with an operating lever and with arms which are connected by links with the toggle joints, substantially as described.

2. In a molding machine the combination of a frame, a vertically movable platform guided in said frame, toggle joints connecting said platform at the ends with the lower part of the frame, a rocker shaft journaled in and movable with said platform and provided with an operating lever and arms which are connected by links with the toggle joints, said arms being provided with stops arranged to engage with the toggle joints and arrest them after they have slightly passed dead centers in lifting the platform, substantially as described.

3. In a molding machine the combination of a frame, a vertically movable platform guided in said frame, toggle joints connected with said platform and frame, one connection of each of said joints consisting of an eccentric pin, and a rocker shaft journaled in and movable with the platform and provided with an operating lever and with arms which are connected by links with said joints, substantially as described.

4. In a molding machine the combination of a frame, a vertically movable platform guided in said frame, toggle joints connecting said platform at the ends with the lower part of said frame and each consisting of adjustably connected members, a rocker shaft journaled in and movable with the platform and provided with an operating lever and with arms which are connected by links with said toggle joints, substantially as described.

5. In a molding machine the combination of a frame having vertical openings and guideways in the ends; a vertically movable platform having guides fitted to said ways, bearings and brackets extending upwardly and outwardly from said guides; toggle joints pivotally connected at their upper ends with said brackets and at their lower ends with said frame; and a rocker shaft journaled in and movable vertically with said bearings and provided with an operating lever and with arms which are connected by links with said toggle joints, substantially as described.

6. In a molding machine the combination of a frame, a mold comprising hinged plates mounted on said frame and provided on their outer sides with inclines, a vertically movable platform guided in said frame, means for raising and lowering said platform, standards mounted on said platform and outwardly offset at their upper ends, a mold closing frame mounted on the upper ends of said standards and provided with bearings which are adapted to engage with said inclines and to close the mold when said platform is elevated, and bearing pieces adjustably mounted upon the offsets of said standards in position to bear against the outer sides of the mold plates adjacent to their hinges when the platform is in its upper position, substantially as described.

7. In a molding machine the combination of a frame comprising end sections having horizontal cross rails at the top and inwardly offset side pieces connecting said end sections, longitudinal bed rails mounted upon and adjustable lengthwise of said cross rails, an adjustable mold comprising drop side and end plates hinged to said bed rails and provided on their outer sides with inclines, a vertically movable platform guided in said frame and provided adjacent to its ends with lateral arms, means for raising and lowering said platform, standards adjustably mounted on said arms and outwardly offset at their upper ends, a frame mounted on the upper ends of said standards and provided with bearings arranged to engage with the inclines on the outer sides of the mold plates and to close the mold when the platform is elevated, and bearing pieces adjustably mounted on the offsets of said standards in position to engage with the outer sides of the mold plates adjacent to their hinges when the platform is in its upper position, substantially as described.

8. In a molding machine the combination of a frame comprising end sections having horizontal cross rails at the top, longitudinal bed rails mounted upon and adjustable lengthwise of said cross rails, an adjustable mold comprising side and end plates hinged adjacent to their lower edges to said bedrails, a partition plate mounted at the ends upon said cross rails between and parallel with said bed rails and provided along its lower edge on opposite sides with ledges at the level of the tops of the bed rails, and removable block supporting frames fitting into the mold compartments and adapted to rest on the tops of the bed rails and on said ledges, substantially as described.

9. In a molding machine the combination of a frame, a mold comprising side and end plates mounted on said frame, a core block detachably secured to an end mold plate, and mortar cavity cores attached to the ends of thin transverse strips fitted into recesses in the back of the core block and secured therewith to the mold plate, substantially as described.

10. In a molding machine the combination of a frame, a mold comprising side and end plates mounted on said frame, a recessed core block having a transverse groove and a vertical slot in the back for detachably bolting it to an end mold plate, and mortar cavity cores attached to and adjustably connected by lapping transverse strips fitted in the back of said core block and adapted to be secured therewith to the mold plate, substantially as described.

11. In a molding machine the combination with a mold plate of a core block having in the back vertically disposed slots which are open at their lower ends and adapted to slip over and engage with the heads of bolts passing through the mold plate, substantially as described.

In witness whereof I hereto affix my signature in presence of two witnesses.

RUDOLPH J. SCHWAB.

Witnesses:
CHAS. L. GOSS,
LYDA E. SAECKER.